Dec. 17, 1929.   H. BURMEISTER   1,740,067
FIRE FOAM DELIVERY APPARATUS
Filed Jan. 17, 1929
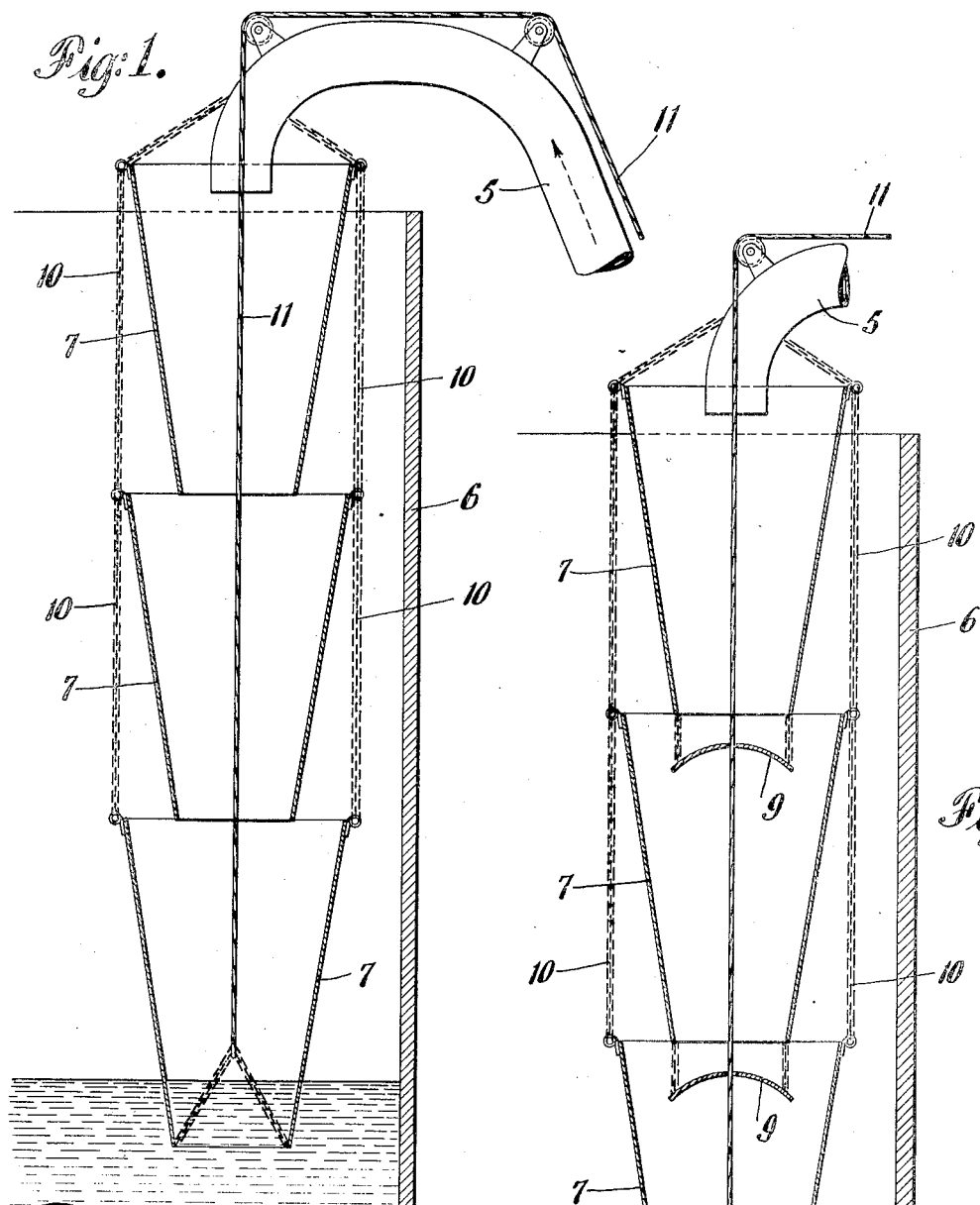
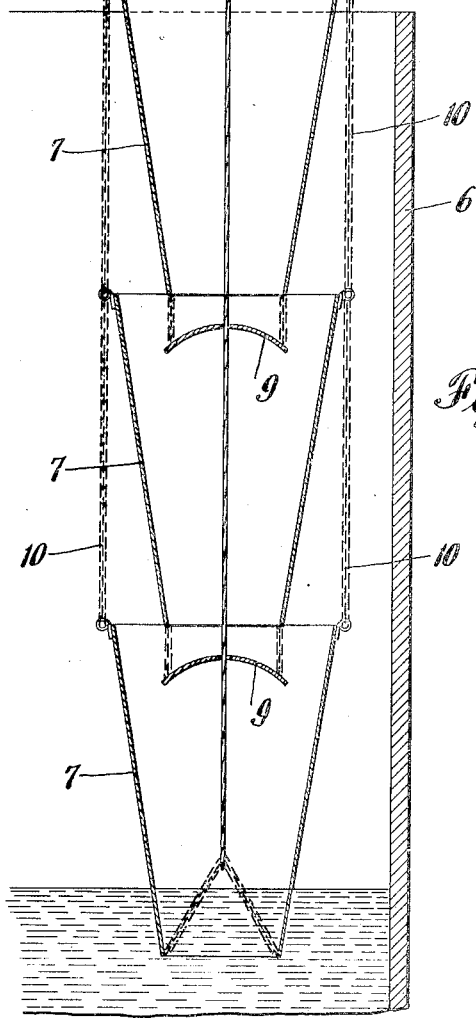
INVENTOR
HANS BURMEISTER
BY
ATTORNEY Patented Dec. 17, 1929

1,740,067

UNITED STATES PATENT OFFICE

HANS BURMEISTER, OF BERLIN, GERMANY, ASSIGNOR TO PYRENE-MINIMAX CORPORATION, A CORPORATION OF DELAWARE

FIRE-FOAM-DELIVERY APPARATUS

Application filed January 17, 1929, Serial No. 333,055, and in Germany January 28, 1928.

The present invention relates to fire fighting apparatus and has for an object to provide improved means for delivering fire foam downwardly onto the surface of a liquid without disturbing said liquid.

When delivering foam onto the surface of oil, for example in a tank which has caught fire, it is desirable that the foam should flow onto the surface of the oil with as little force as possible in order that it may not stir up the oil or cause spattering thereof and in order that the foam may not be destroyed by mixing with the oil.

It is possible to flow the foam against the side of the tank and if the tank walls are suitably shaped and if conditions are otherwise favorable this method of introducing the foam down into the tank may serve. Under some conditions, however, due to irregularity of the shape of the tank walls or the heat of said walls this method is not effective.

The present invention provides an apparatus which can be introduced into an oil tank over the upper edge thereof for flowing the foam to the surface of the oil in such manner that the quality of the foam is maintained and the surface of the oil is not disturbed.

The nature and objects of the invention will be better understood from a description of a particular illustrative embodiment for the purpose of which description reference should be had to the accompanying drawings forming a part hereof and in which—

Figure 1 is a side view of a foam delivering apparatus constructed in accordance with the principles of the invention, and Figure 2 is a detail view showing the construction of an illustrative form of baffle member.

The structure shown for the purposes of illustrating the invention comprises a series of deflecting baffle members adapted to be suspended beneath the outlet of a foam delivery pipe to retard the fall of the foam as it is delivered downwardly onto the surface of oil in an oil tank.

As shown a pipe 5 is arranged to deliver foam over the side wall 6 of an oil tank. Beneath the end of the pipe are suspended a series of baffle members 7 through which the foam flows downwardly to the surface of the oil. These members are formed of a suitable shape to retard the fall of the foam sufficiently so that spattering of the oil as the foam reaches the surface thereof will be prevented and yet effective rapidity of flow will be maintained. In the illustrative embodiment, the baffle members are of funnel or bucket form tapering downwardly and positioned with the lower end of one bucket extending into the top of the bucket next below. The bottom of each bucket is formed with a baffle member 9 extending across the bottom thereof but spaced from the lower edge of the body of the bucket to permit sufficiently free flow of the foam. The baffle plate of the bottom bucket may be omitted as shown if desired. By this arrangement the fall of the foam is retarded at least at the bottom of each bucket.

The tapered form of buckets being advantageous for the retarding of the flow of the foam inside of said buckets.

In operation the foam escaping from the delivery end of the pipe 5 will pour into the uppermost funnel or bucket 7, flow outwardly through the bottom thereof into the next bucket and so downwardly until finding resistance in the bucket engaging the oil, it will pile up in such bucket and flow over the upper edge thereof.

The taper of the several buckets is such as to leave ample space between the telescope walls to permit free flow of foam under these conditions.

The several buckets may conveniently be connected to each other and suspended from the delivery end of the pipe 5 by suitable chains 10 or other suitable flexible members and it may be convenient in handling the apparatus to provide a wire cable 11 or other suitable flexible member extending down through the center of the buckets and secured to the bottom of the lowermost bucket. As will be clear from the drawing all of the buckets can be readily telescoped and collapsed into a compact unit at the top for convenience in handling and movement over the top of the wall of the tank.

The foregoing description is illustrative merely and is not intended as defining the limits of the invention.

I claim—

1. In an apparatus for delivering fire foam vertically downward onto the surface of the liquid, the combination with a foam delivery pipe of a series of vertically arranged funnel-shaped members through which the foam may descend and by which its fall is retarded, each funnel-shaped member being provided at its bottom with a baffle plate to obstruct the flow of foam.

2. In apparatus for delivering fire foam vertically downward onto the surface of the liquid, the combination with a foam delivery pipe of a series of tapered baffle members arranged to conduct foam downwardly in a tortuous path and means for collapsing said series of baffle members into a compact unit for convenience in handling, substantially as and for the purpose described.

3. In apparatus for delivering fire foam vertically downward onto the surface of the liquid, the combination with a foam delivery pipe of a series of telescoping funnel-shaped tapered members for retarding the flow of foam downwardly therethrough, a plurality of flexible members connecting said funnel-shaped members together with a flexible member extending downwardly through the center thereof and arranged to lift said members to collapse the series into a compact unit for handling.

In testimony whereof, I have signed my name to this specification this 20th day of December, 1928.

HANS BURMEISTER.